United States Patent
Dain et al.

(10) Patent No.: US 11,042,532 B2
(45) Date of Patent: Jun. 22, 2021

(54) PROCESSING EVENT MESSAGES FOR CHANGED DATA OBJECTS TO DETERMINE CHANGED DATA OBJECTS TO BACKUP

(71) Applicant: International Business Machines Corporation, Armonk, NY (US)

(72) Inventors: Joseph W. Dain, Tucson, AZ (US); Nilesh Bhosale, Pune (IN); Gregory T. Kishi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 16/120,179

(22) Filed: Aug. 31, 2018

(65) Prior Publication Data

US 2020/0073978 A1 Mar. 5, 2020

(51) Int. Cl.
*G06F 16/00* (2019.01)
*G06F 16/23* (2019.01)
*G06F 11/14* (2006.01)
*G06F 9/54* (2006.01)
*G06F 3/06* (2006.01)
*G06F 16/182* (2019.01)

(52) U.S. Cl.
CPC ........ *G06F 16/2365* (2019.01); *G06F 3/0619* (2013.01); *G06F 3/0653* (2013.01); *G06F 3/0673* (2013.01); *G06F 9/542* (2013.01); *G06F 9/546* (2013.01); *G06F 11/1451* (2013.01); *G06F 11/1469* (2013.01); *G06F 16/182* (2019.01)

(58) Field of Classification Search
CPC ............... G06F 16/2365; G06F 16/182; G06F 11/1451; G06F 9/542; G06F 11/1469; G06F 9/546; G06F 3/0619; G06F 3/0653; G06F 3/0673; G06F 16/113
See application file for complete search history.

(56) References Cited

U.S. PATENT DOCUMENTS

| | | |
|---|---|---|
| 6,092,059 A | 7/2000 | Straforini et al. |
| 8,407,805 B2 | 3/2013 | Harrington et al. |

(Continued)

OTHER PUBLICATIONS

"Guide to Data Protection Best Practices" dated 2016, Tanberg Data, Total 12 pages.

(Continued)

*Primary Examiner* — Alexander Khong
(74) *Attorney, Agent, or Firm* — Konrad Raynes Davda & Victor LLP; David W. Victor (57) ABSTRACT

Provided are a computer program product, system, and method for backing up data from a plurality of source data sets to a backup storage. Event messages are received. Each event message indicates an update to a changed data object in one of the source data sets. The event messages are added to at least one message queue. The event messages are read in the at least one message queue. A record is added to a database for each of the read event messages. Records added to the database include information on changed data objects. The database is queried to determine records for changed data objects that satisfy a backup criteria. The changed data objects in at least one of the source data sets that satisfy the backup criteria are copied to the backup storage.

24 Claims, 6 Drawing Sheets

(56) References Cited

U.S. PATENT DOCUMENTS

| | | |
|---|---|---|
| 8,522,050 B1 | 8/2013 | Wakerley |
| 8,590,050 B2 | 11/2013 | Nagpal et al. |
| 8,751,424 B1 | 6/2014 | Nojcik et al. |
| 8,805,779 B2 | 8/2014 | Ficara et al. |
| 9,026,497 B2 | 5/2015 | Gokhale et al. |
| 9,135,266 B1 | 9/2015 | Makin |
| 9,632,878 B1 | 4/2017 | Maccanti et al. |
| 9,734,169 B2 | 8/2017 | Redlich et al. |
| 9,805,192 B1 | 10/2017 | Gates et al. |
| 9,846,784 B1 | 12/2017 | Murray et al. |
| 10,089,287 B2 | 10/2018 | Rebstock et al. |
| 10,200,470 B1* | 2/2019 | Chakraborty ....... H04L 67/1095 |
| 10,324,804 B1* | 6/2019 | Patwardhan ........ G06F 11/1451 |
| 2010/0274750 A1 | 10/2010 | Oltean et al. |
| 2011/0107042 A1 | 5/2011 | Herron |
| 2011/0173404 A1* | 7/2011 | Eastman ............. G06F 11/1451 711/162 |
| 2015/0074052 A1* | 3/2015 | Srinivasan .............. G06F 16/27 707/634 |
| 2015/0142752 A1 | 5/2015 | Chennamsetty et al. |
| 2015/0324609 A1 | 11/2015 | Grubel et al. |
| 2017/0091047 A1* | 3/2017 | Bangalore .......... G06F 11/1461 |
| 2017/0104756 A1 | 4/2017 | Rosenthal et al. |
| 2017/0132186 A1 | 5/2017 | Plummer |
| 2017/0262520 A1* | 9/2017 | Mitkar .................. G06F 16/275 |
| 2018/0268166 A1 | 9/2018 | Alberton et al. |
| 2019/0356717 A1 | 11/2019 | Chen et al. |

OTHER PUBLICATIONS

Orlando, K. et al., "IBM ProtecTIER Implementation and Best Practices Guide", dated Jun. 2016, Fourth Edition, International Technical Support Organization, Doc. No. SG24-8025-03, Total 512 pages.

IBM, "Backup Policy Management Across Heterogeneous Environments" dated Feb. 8, 2007, An IP.com Prior Art Database Technical Disclosure, IP.com No. IPCOM000146230D, Total 3 pages.

IBM, "Managing LOCAL Backups in the Context of Policy in Shared Storage Environments", dated Apr. 21, 2006, An IP.com Prior Art Database Technical Disclosure, IP.com No. IPCOM000135698D, Total 3 pages.

Anonymous, "Automated Aggregate Threshold Data Preservation" dated Jan. 11, 2011, An IP.com Prior Art Database Technical Disclosure, IP.com No. IPCOM000202949D, Total 4 pages.

Office Action, dated Jun. 1, 2020, for U.S. Appl. No. 16/174,276 (22.159), invented by Gregory T. Kishi, Total 31 pages.

"IBM Cloud Object Storage System Definitive Guide to Dispersed Storage", IBM Corporation, [online] [retrieved Sep. 27, 2018] https://www.ibm.com/support/knowledgecenter/STXNRM_3.13.4/coss.doc/pdfs/coss_dispersed_book.pdf, pp. 40.

"Erasure code", Wikipedia, [online][retrieved Sep. 27, 2018], https://en.wikipedia.org/wiki/Erasure_code, pp. 5.

O. Khan, et al., "Rethinking Erasure Codes for Cloud File Systems:Minimizing I/O for Recovery and Degraded Reads", pp. 14.

List of Patents or Patent Applications Treated as Related, dated Nov. 28, 2018, pp. 2.

US patent application, dated Oct. 29, 2018, for U.S. Appl. No. 16/174,272 (22.156), invented by Gregory T. Kishi, Total 38 pages.

US patent Application, dated Nov. 15, 2018, for U.S. Appl. No. 16/192,793 (22.157), invented by Joseph W. Dain, Total 36 pages.

US patent Application, dated Nov. 15, 2018, for U.S. Appl. No. 16/192,795 (22.158), invented by Joseph W. Dain, Total 35 pages.

US patent Application, dated Oct. 29, 2018, for U.S. Appl. No. 16/174,276 (22.159), invented by Gregory T. Kishi, Total 38 pages.

Response to Office Action, dated Aug. 30, 2020, for U.S. Appl. No. 16/174,272 (22.156), invented by Gregory T. Kishi, Total 11 pages.

Response to Office Action, dated Aug. 30, 2020, for U.S. Appl. No. 16/174,276 (22.159), invented by Gregory T. Kishi, Total 11 pages.

Office Action, dated Nov. 3, 2020, for U.S. Appl. No. 16/192,793 (22.157), invented by Joseph W. Dain, Total 55 pages.

Office Action, dated Nov. 3, 2020, for U.S. Appl. No. 16/192,795 (22.158), invented by Joseph W. Dain, Total 54 pages.

Office Action, dated Jun. 2, 2020, for U.S. Appl. No. 16/174,272 (22.156), invented by Gregory T. Kishi, Total 31 pages.

Notice of Allowance, dated Dec. 8, 2020, for U.S. Appl. No. 16/174,276 (22.159), invented by Gregory T. Kishi, Total 20 pages.

* cited by examiner

FIG. 1

Event Message

FIG. 2

Database Record

Message Queue Subscriber Information

PROCESSING EVENT MESSAGES FOR CHANGED DATA OBJECTS TO DETERMINE CHANGED DATA OBJECTS TO BACKUP

BACKGROUND OF THE INVENTION

1. Field of the Invention

The present invention relates to a computer program product, system, and method for processing event messages for changed data objects to determine changed data objects to backup.

2. Description of the Related Art

Backup systems may backup files and data objects from multiple storage devices in different file systems in a distributed computing and storage environment. To backup up data across multiple storage devices, current backup systems or programs installed in the client systems scan the client file systems to determine files to backup at a central backup storage.

There is a need in the art for improved techniques to backup files and data at distributed storage locations.

SUMMARY

Provided are a computer program product, system, and method for backing up data from a plurality of source data sets to a backup storage. Event messages are received. Each event message indicates an update to a changed data object in one of the source data sets. The event messages are added to at least one message queue. The event messages are read in the at least one message queue. A record is added to a database for each of the read event messages. Records added to the database include information on changed data objects. The database is queried to determine records for changed data objects that satisfy a backup criteria. The changed data objects in at least one of the source data sets that satisfy the backup criteria are copied to the backup storage.

With the above embodiment, a database is populated with information on changed data objects in real-time from messages generated from source data sets in real-time. This real time database may be searched to immediately determine changed data objects that satisfy a backup criteria, such as files changed since a point-in-time, to create a backup set of data objects to backup to a backup storage. This allows changes to data objects in source data sets to be recorded in a database to allow fast determination of changed data objects to backup without having to scan file systems for changed data objects to backup.

In a further embodiment, the copying the changed data objects comprises: determining, from the determined records satisfying the backup criteria, storage locations of the changed data objects in the source data sets; reading the changed data objects from the determined storage locations in the source data sets; and copying the read changed data objects to the backup storage.

With the above embodiment, the changed data objects to backup can be quickly determined by querying a database to determined changed data objects satisfying a backup criteria, and the changed data objects can be determined from storage locations of the changed data objects to read and copy to backup storage. This allows for fast determination of changed data objects from a database to read and copy to backup storage.

In a further embodiment, there are a plurality of message queues and consumer processes, each of the consumer processes assigned to process event messages from one of the message queues. There is one message queue for each of the source data sets to receive event messages for changed data objects in a source data set. A consumer process is periodically invoked to read the event messages in one of the message queues and add records to the database for each of the read event messages.

With the above embodiment, event messages of changed data objects may be placed in queues specific to the data set having the changed data object. Information on change data objects is added to the database based on a frequency at which the consumer process is invoked to process the message queue and add records to the database. This allows for fast determination of changed data objects immediately indicated in a message queue because the event message is added to a queue dedicated to the data set having the changed data object that is processed based on the frequency at which the consumer is invoked.

In a further embodiment, each of the records in the database indicates a time the changed data object was changed. The backup criteria indicates a point-in-time to determine changed data objects changed since the point-in-time to create a backup set of changed data objects from the source data sets that changed since the point-in-time.

With the above embodiment, a backup set that has all changed data objects across all source data sets as of a point-in-time may be quickly determined by querying a database for changed data objects having a changed time as of the point-in-time specified in the backup criteria to allow fast determination of changed data objects as of a specified point-in-time without having to scan a file system.

In a further embodiment, the event messages are generated immediately after modifying the changed data objects to provide information on real-time changes to changed data objects in the source data sets to the at least one message queue and the database.

With the above embodiment, by generating the event messages immediately after the data object is changed, the database is updated in real-time with information on changed data objects immediately indicated in the message queues. In this way, when the database is queried to determine change data objects, the determined changed data objects include those just modified and indicated in event messages in the message queues.

Provided are a computer program product, system, and method for backing up data from a plurality of source data sets to a backup storage. Event messages are received from the source data sets. Each event indicates an update to a changed data object in one of the source data sets. The event messages are added to at least one message queue. The event messages are read in the at least one message queue. A determination is made from the read event messages whether information on the changed data object satisfies a backup criteria. The changed data objects in at least one of the source data sets that satisfy the backup criteria are copied to the backup storage.

With the above embodiment, the changed data objects to backup are determined directly from the event messages in the message queues without having to query a database, which allows for a faster determination of the data objects to backup, such as in real time from when the data object was changed. In certain embodiments, the changed data object may be determined to backup even before the changed data object in a memory of the source.

In a further embodiment, notification is received of an event message added to a specified message queue of the at least one message queue. The specified message queue is read to read the event message which when added to the specified message queue caused transmission of the notification.

With the above embodiment, processing of an event message having information on a changed data object is performed immediately when an event message is added to the queue because notification is received of an event message when added to a queue. This allows for immediate processing of changed data objects to determine whether they should be backed up to backup storage to provide real-time determination to backup a changed data object when the data object is changed.

In a further embodiment, in response to adding an event message to a message queue of the at least one message queue, a consumer process is determined that is subscribed to the message queue to which the event message was added. The notification is sent to the determined consumer process to cause the determined consumer process to read the event message added to the message queue.

With the above embodiment, a consumer is notified when the event message is added to the queue so that the consumer may immediately process the event message to determine whether to backup the changed data object indicated in the event message.

In a further embodiment, the copying the changed data objects comprises:
determining, from the determined event messages having information satisfying the backup criteria, storage locations of the changed data objects in the source data sets;
reading the changed data objects from the determined storage locations in the source data sets; and transferring the read changed data objects to the backup storage.

With the above embodiment, an event message indicating a changed data object is directly processed from the message queue to determine whether the change data object satisfies a backup criteria so that it is immediately backed-up in real-time from when the change is made, because the event message is generated and added to a message queue when the data object is changed, and the message queue is immediately processed when a message is added to a queue to determine whether to backup. This allows for very fast backup of change data objects without substantial delays, such as time needed to scan a file system.

DETAILED DESCRIPTION

Backup systems that backup changed files in large storage environments having files distributed across numerous heterogeneous storage systems, will scan numerous files, such as billions of files, in the distributed storage and file systems, to determine files to backup according to a backup policy. One problem with current scanning backup techniques is that as scale of the number of files in distributed file systems increases to several billion files and database records, the time to complete the scanning across different storage systems substantially increases. Increasing the time to determine files to backup results in less frequent backups, which may not comply with recovery point objectives (RPO) for a maximum time between backups.

Described embodiments substantially reduce the time to determine changed data objects to backup by having the source or client systems generate in real-time event messages having information on changed data objects that are sent to a backup server to dispatch to message queues. The event messages are processed from the message queues to add to a database. The database may be queried for changed data objects satisfying a backup query to very quickly determine from the database, such as from a fast database index, changed data objects to backup from the local client storage systems to a backup storage. In this way, a database is populated with information on changed data objects in real-time from messages generated from source systems in real-time, and this real-time database may be searched to immediately determine changed data objects that satisfy a backup criteria, such as files changed since a point-in-time, to create a backup set of data objects to backup to a backup storage.

In a further embodiment, the determination of changed data objects may be immediately determined from the message queues by notifying a consumer process when an event message is added to a message queue. The notified consumer process reads an event message from the message queue for which the notification was sent and immediately determines whether this recently modified data object satisfies a backup criteria such that the changed data object should be backed up to backup storage.

With the described embodiments, event messages on changed data objects from source systems in a distributed computing environment may be processed to determine, in real-time, changed data objects from different source systems to include in a backup set. The changed data objects in the backup set determined from the database or message queues may then be copied to backup storage.

Figure 1:
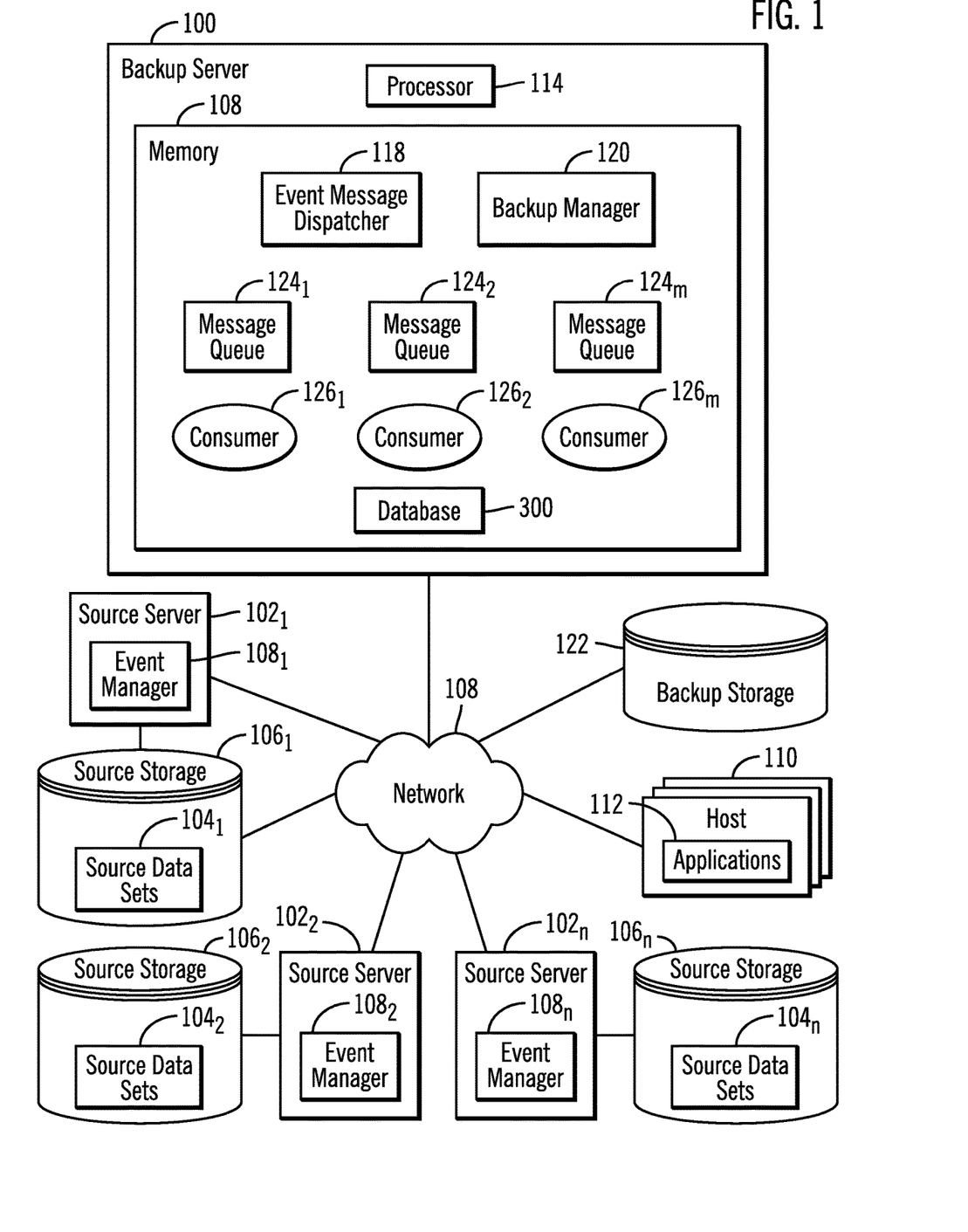
FIG. 1 illustrates an embodiment of a backup storage environment.

FIG. 1 illustrates an embodiment of a backup storage environment including a backup server 100 that receives event messages 200 (FIG. 2) from source servers $102_1$, $102_2 \ldots 102_n$ that are generated when a source server $102_i$ applies an update to a data object in source data sets $104_1$, $104_2 \ldots 104_n$ stored in a source storage $106_1$, $106_2 \ldots 106_n$ managed by the source server $102_i$, where the update to a data object in a source data set $104_i$, such as a delete, modification or adding of a data object. A data object may comprise a file, database object, logical blocks, volume, chunks, extents or any other storage unit in which data may be separately manipulated and addressed. Event managers $108_1, 108_2 \ldots 108_n$ at the source servers $102_1, 102_2 \ldots 102_n$ create and send the event messages 200 to the backup server 100 upon receiving a modification to a data object from an application 112 in a host system 110 in real-time before the modification is applied to the source data set $104_i$. In this way, the backup server 100 receives event messages 200 on modifications to data objects immediately in real-time when the changes are made, and in certain embodiments before the changes are applied to the source storage $106_i$.

Figure 2:
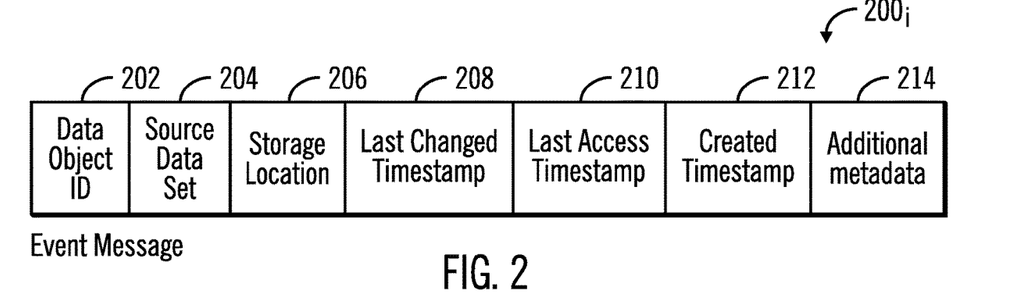
FIG. 2 illustrates an embodiment of an event message.

The backup server 100 includes a processor 114, such as one or more processor devices, and a memory 116 having program code executed by the processor 114, including an event message dispatcher 118 to process event messages 200 from event managers $108_1, 108_2 \ldots 108_n$ and a backup manager 120 to backup modified data objects to a backup storage 122. The event message dispatcher 118 receives event messages 200 and adds the messages to one or more message queues $124_1, 124_2 \ldots 124_m$ in the memory 116. For instance there may be a message queue $124_i$ for each source data set $104_i$ and an event message 200 for an update to a data object in source data set $104_i$ at one of the source storages $106_1, 106_2 \ldots 106_n$ is added to the message queue $124_i$ for the source data set $104_i$ having the updated data object. The memory 116 may further include one or more consumers $126_1, 126_2 \ldots 126_m$ to process event messages in one or more of the message queues $124_1, 124_2 \ldots 124_m$ to convert the information on an updated data object in an event message 200 to a database record $300_i$ (FIG. 3) to store in a database 300. The backup manager 120 may process the database 300 to determine updated data objects to backup to the backup storage 122.

There may be any number of message queues $124_i$ and consumers $126_i$ to process the message queues $124_i$ where consumers $126_i$ may process requests from one or more of the message queues $124_i$. In certain embodiments, there may be a separate message queue $124_i$ for each source data set $104_i$.

The database 300 may comprise a No Structured Query Language (No SQL) database, an SQL database, a relational database, objected oriented database, Extended Markup Language (XML) database, and any other suitable database known in the art.

The source storages $106_1, 106_2 \ldots 106_n$ may be implemented in different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices implementing the storages $106_1, 106_2 \ldots 106_m$ may comprise heterogeneous storage devices from different vendors and different types of storage devices, such as a first type of storage devices, e.g., hard disk drives, that have a slower data transfer rate than a second type of storage devices, e.g., SSDs.

The memory 108 may comprise a suitable volatile or non-volatile memory devices, including those described above.

FIG. 2 illustrates an embodiment of an instance of an event message 200 generated by an event manager $108_i$ to provide to the backup server 100 to use to backup updated data objects in a source data set $104_i$, and includes a data object ID 202 identifying a data object in a source data set 204; a storage location 206 of the data object 202 in the source data set 204, such as a block address; a last changed timestamp 208 indicating when the data object 202 was last changed; a last access timestamp 210 indicating a time when the changed data object was last accessed; a created timestamp 212 indicating a time when the changed data object 202 was created; and additional metadata 214 on the changed data object, such as an application or application type that created/modified the data object 202, a data type of the data object 102, a priority of the data object 102, etc.

Figure 3:
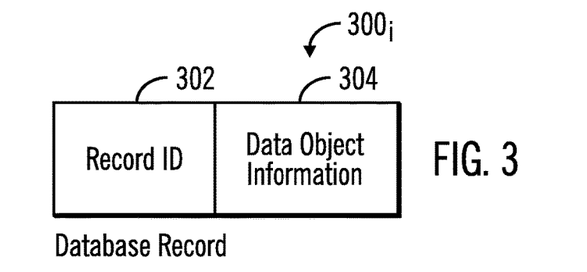
FIG. 3 illustrates an embodiment of database record.

FIG. 3 illustrates an embodiment of a database record $300_i$ in the database 300 and includes a record identifier (ID) 302 identifying the database record $300_i$ in the database 300 and data object information 304, which may comprise all or some of the information in the event message 200 in fields of the database record $300_i$. The database 300 may also include an index to allow fast searching of records $300_i$ based on relevant backup key/value pairs, such as the time the database object was last updated, data type, source data set, etc.

Figure 4:
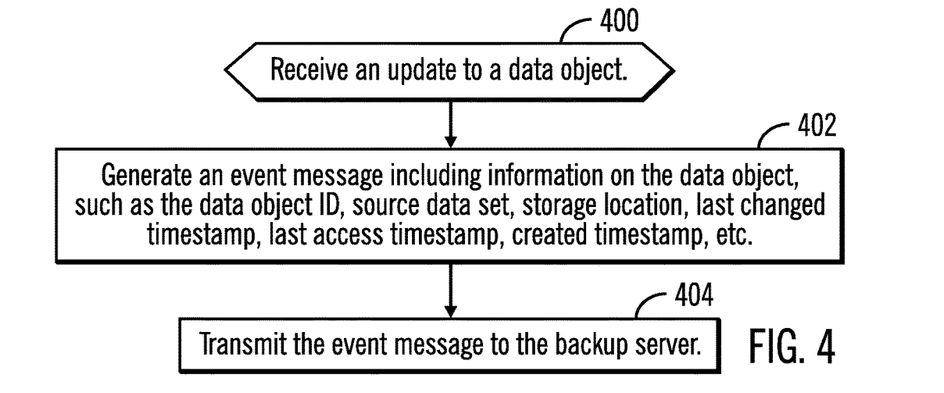
FIG. 4 illustrates an embodiment of operations to generate an event message for an updated data object.

FIG. 4 illustrates an embodiment of operations performed by an event manager $108_i$ to generate an event message 200 for an update to a data object in a source data set $104_i$ managed by the event manager $108_i$. Upon receiving (at block 400) the update to a data object, the event manager $108_i$ generates (at block 402) an event message 200 including information on the data object, such as the data object ID 202, source data set 204, storage location 206, last changed timestamp 208, last access timestamp 210, created timestamp 212, additional metadata 214, etc. The generated event message 200 is sent (at block 404) to the backup server 100 to dispatch to one of the message queues $124_1, 124_2 \ldots 124_m$.

With the embodiment of FIG. 4, the event manager $108_i$ may generate the event message 200 immediately upon receiving the update to the data object before the update is applied to the source storage $106_i$. In this way, the event messages 200 provide real time information on updates to the data objects to the backup server 100 so that the database 300 has current information on changed data objects.

Figure 5:
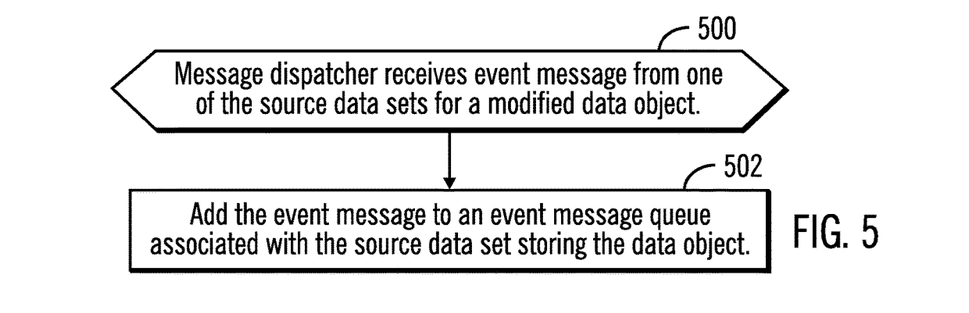
FIG. 5 illustrates an embodiment of operations to dispatch an event message to a message queue.

FIG. 5 illustrates an embodiment of operations performed by the event message dispatcher 118 to process an event message 200 received from an event manager $108_i$ having information on an update to a data object in a source data set $104_i$. Upon receiving (at block 500) an event message 200, the event message dispatcher 118 adds (at block 502) the event message 200 to an event message queue $124_i$ associated with the source data set 204 identified in the received event message 200.

Figure 6:
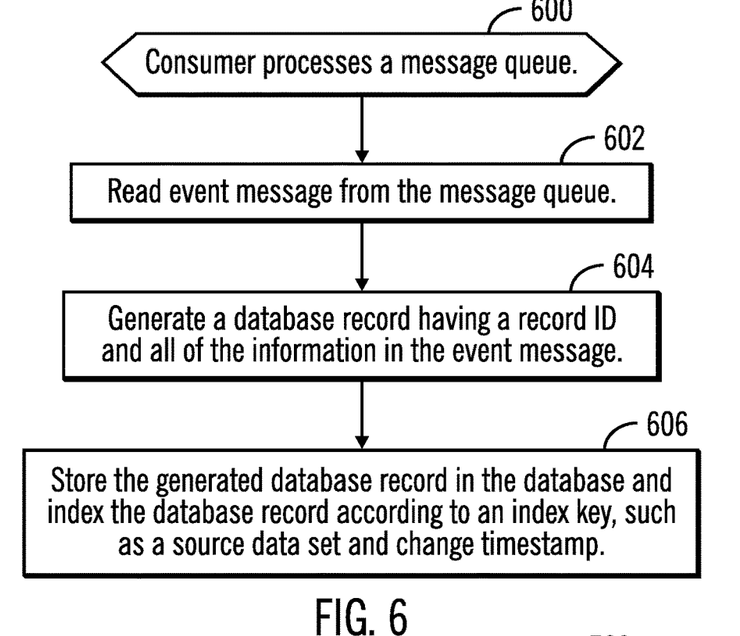
FIG. 6 illustrates an embodiment of operations to process a message queue.

FIG. 6 illustrates an embodiment of operations performed by a consumer $126_i$ process to process one or more event messages 200 in a message queue $124_i$. Upon a consumer $126_i$ processing (at block 600) a message queue $124_i$, the consumer $126_i$ reads (at block 602) an event message 200 from the message queue $124_i$ and generates (at block 604) a database record $300_i$ having a record ID 302 and database object information 304 comprising the information 202, 204, 206, 208, 210, 212, and 214 in the received event message 200. The generated database record $300_i$ is stored (at block 606) in the database 300 and a database index according to an index key, such as a source data set, change timestamp, etc.

With the embodiments of FIGS. 4, 5, and 6, information on real-time updates to data objects are generated and provided to the backup server 100 to store in the database 300. In this way, the database 300 immediately reflects the current state of updates to data objects to use to form backup sets having updated data objects that satisfy a backup criteria. Further, the event message dispatcher 118 receives event messages 200 from different source data sets $104_1$, $104_2$ . . . $104_n$ to allow the database 300 to reflect updates to source data sets on different and heterogeneous source storages $106_1$, $106_2$ . . . $106_n$ and file systems.

Figure 7:
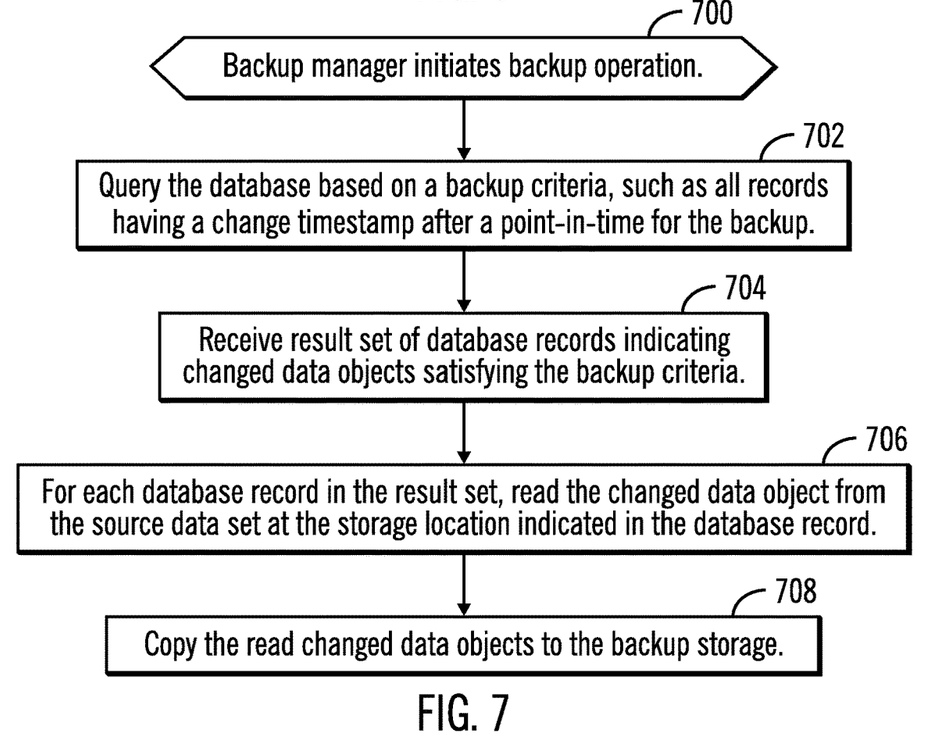
FIG. 7 illustrates an embodiment of operations to perform a backup operation.

FIG. 7 illustrates an embodiment of operations performed by the backup manager 120 to form a backup set using the database 300. Upon initiating (at block 700) a backup operation, the backup manager 120 queries (at block 702) the database 300 based on a backup criteria comprising one or more criteria such as a point-in-time to determine all updates having a last changed timestamp 208 greater or equal to a point-on-time, one or more source data sets to identify updated data objects in one or more source data sets $104_i$, application type, data type, etc. A backup result set is received (at block 704) of database records $300_i$ having data object information 304 satisfying the backup criteria. For each database record $300_i$ satisfying the backup criteria, the backup manager 120 copies (at block 706) the changed data object from the source data set and storage location in a source storage $106_i$ indicated in the data object information 304 of the database record $300_i$. The read changed data objects are transferred (at block 708) to the backup storage 122 to store as a backup set.

With the embodiments of FIG. 7, the backup manager 120 may form backups satisfying a recovery objective (RPO) indicating a maximum time between any two consistency groups, such that a new consistency group should be created within the recovery point objective time. The backup manager 120 may form a backup set of data objects to backup immediately upon querying the database 300, which can be performed very fast using a database index. In this way, multiple backup sets may immediately be formed using the database 300, and the changed data object backed up to the backup storage 122. Further, because the database 300 provides real-time information on updated data objects, the backup sets formed by querying the database 300 have the most recent modified data objects.

Figure 8:
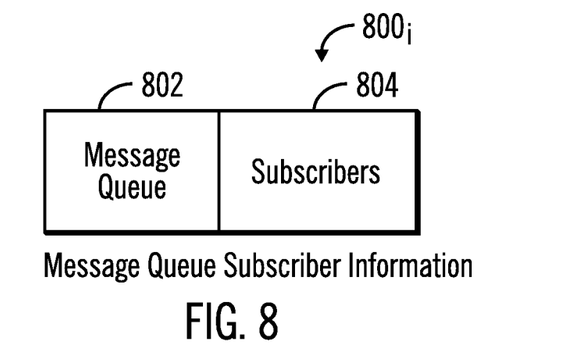
FIG. 8 illustrates an embodiment of message queue subscriber information.
Figure 9:
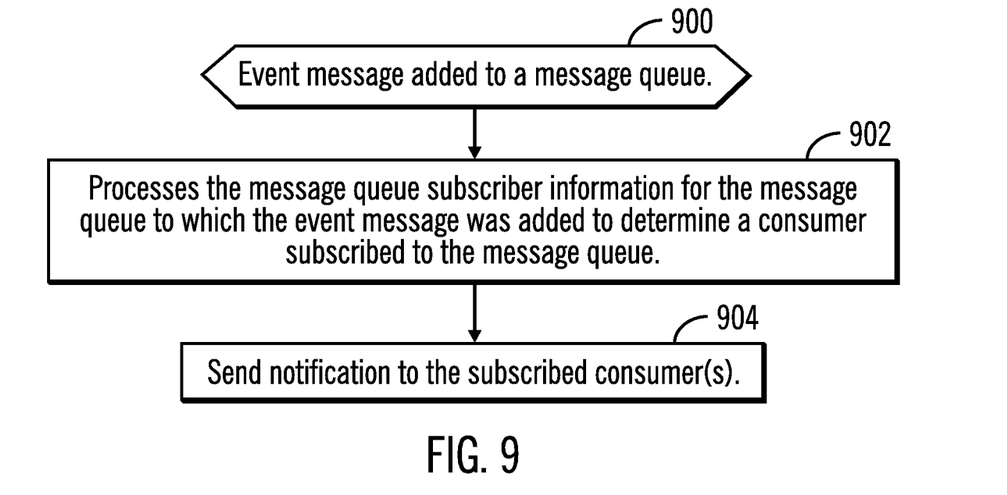
FIG. 9 illustrates an embodiment of operations to provide a notification for an event message added to a message queue.
Figure 10:
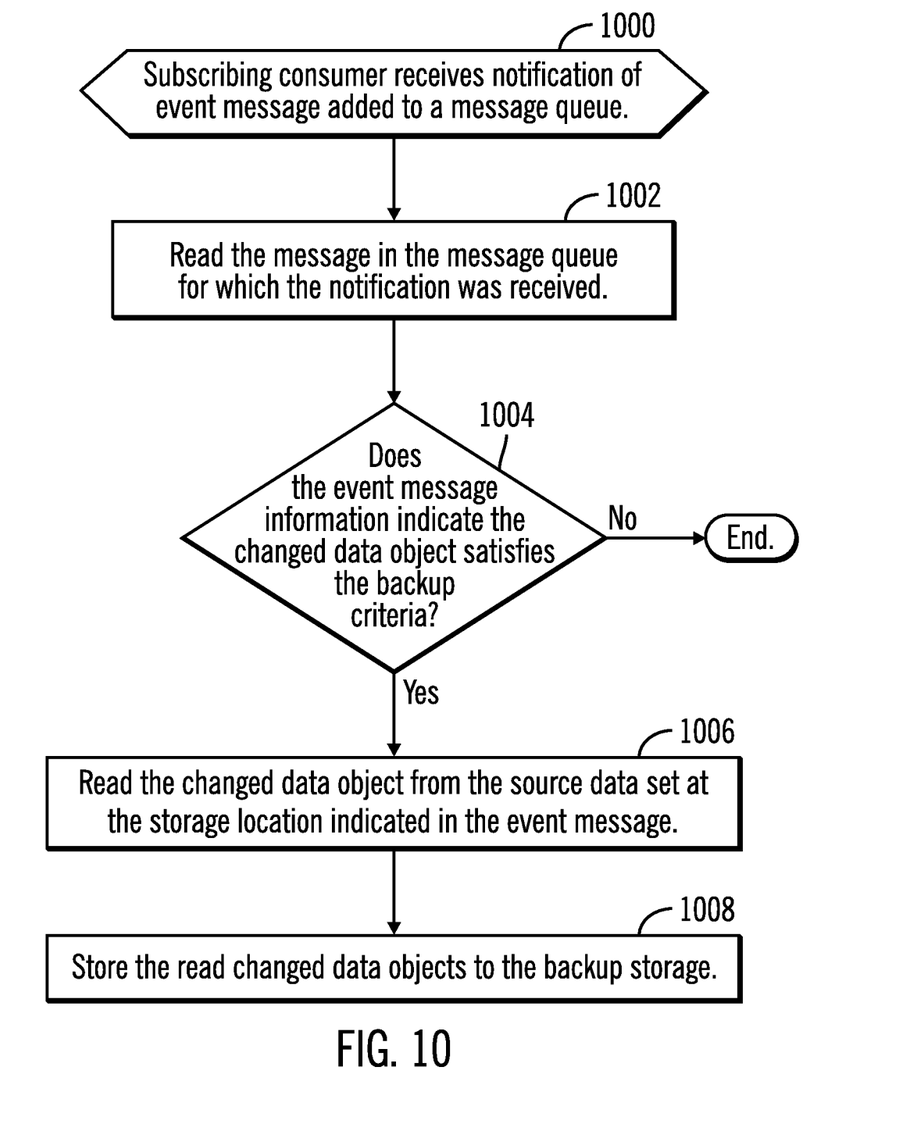
FIG. 10 illustrates an embodiment of operations to process a notification of an event message added to a message queue.

FIGS. 8, 9, and 10 illustrate an alternative embodiment where the changed data objects to backup are determined directly from the event messages 200 in the message queues $124_1$, $124_2$ . . . $124_m$ without having to query the database 300, which allows for a faster determination of the data objects to backup, such as in real time from when the data object was changed. In certain embodiments, the changed data object may be determined to backup even before the changed data object in a memory of the source servers $102_1$, $102_2$ . . . $102_n$ has been written to the source storage $106_1$, $106_2$ . . . $106_n$.

FIG. 8 illustrates an embodiment of message queue subscriber information $800_i$ the event message dispatcher 118 maintains for each message queue $124_i$ to determine consumers $126_1$, $126_2$ . . . $126_m$ that subscribe to the message queues $124_i$. The event message dispatcher 118 may maintain one instance of message queue subscriber information $800_i$ for each message queue $124_i$. The message queue subscriber information $800_i$ includes a message queue 802 and a list of zero or more consumers 804 that are to be notified when an event message 200 is added to a message queue $124_i$.

FIG. 9 illustrates an embodiment of operations performed by the event message dispatcher 118 after adding a received event message 200 to an event message queue $124_i$, such as after performing the operations of FIG. 5. After adding (at block 900) the event message 200 to the event message queue $124_i$, the event message dispatcher 118 processes (at block 902) the message queue subscriber information $800_i$ for the message queue $124_i$ to which the event message 200 was added to determine a consumer 804 subscribed to the message queue 802. A notification is sent (at block 904) to the determined subscribed consumers 804 to process.

FIG. 10 illustrates an embodiment of operations performed by a consumer $126_i$ to process the notification sent at block 904 of an event message $200_i$ added to the event message queue $124_i$. Upon a subscribing consumer $126_i$ receiving the notification, the subscribed consumer $126_i$ reads (at block 1002) the message 200 in the message queue $124_i$ for which the notification was received. If (at block 1004) the event message information 202 . . . 214 indicate the changed data object satisfies a backup criteria, e.g., a time the data object was changed following a point-in-time of the backup, then the consumer $126_i$ or backup manager 120 reads (at block 1006) the changed data object from the source data set 204 at the storage location 206 indicated in the event message 200. The read changed data object is stored (at block 1008) in the backup storage 122. If (at block 1004) the event message information 200 for which the notification was received does not satisfy the backup criteria, then control ends without backing up that changed data object.

In certain embodiments, multiple consumers may receive the notification of an event message 200 added to a message queue $120_i$ to allow different consumers $126_i$ to provide independent and separate backup criteria to determine whether the changed data object should be part of one of a plurality of backup data sets being formed by different consumers $126_i$.

With the embodiment of FIGS. 8, 9, and 10, real-time reporting of changes to data objects in event message are processed by consumers $126_1$, $126_2$ . . . $126_m$ subscribed to the message queue $124_i$ to which the real-time event message 200 is added to allow for an immediate determination of whether the data object satisfies a backup criteria to backup to the backup storage 122. In this way, there are no delays to backup a data object after it is updated because the object is backed up immediately upon the consumer being alerted of the change to the data object when the changed data object satisfies a backup criteria, such as a criteria related to the source data set 204, last changed timestamp 208 and additional metadata 214. Further, in certain implementations, because the event message 200 is provided immediately to the backup server 100 even before the changed data object is stored in the source storage $106_i$, the changed data object may be stored in the backup storage 122 before the changed data object is written to the source storage $106_i$.

In the described embodiment, variables i, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
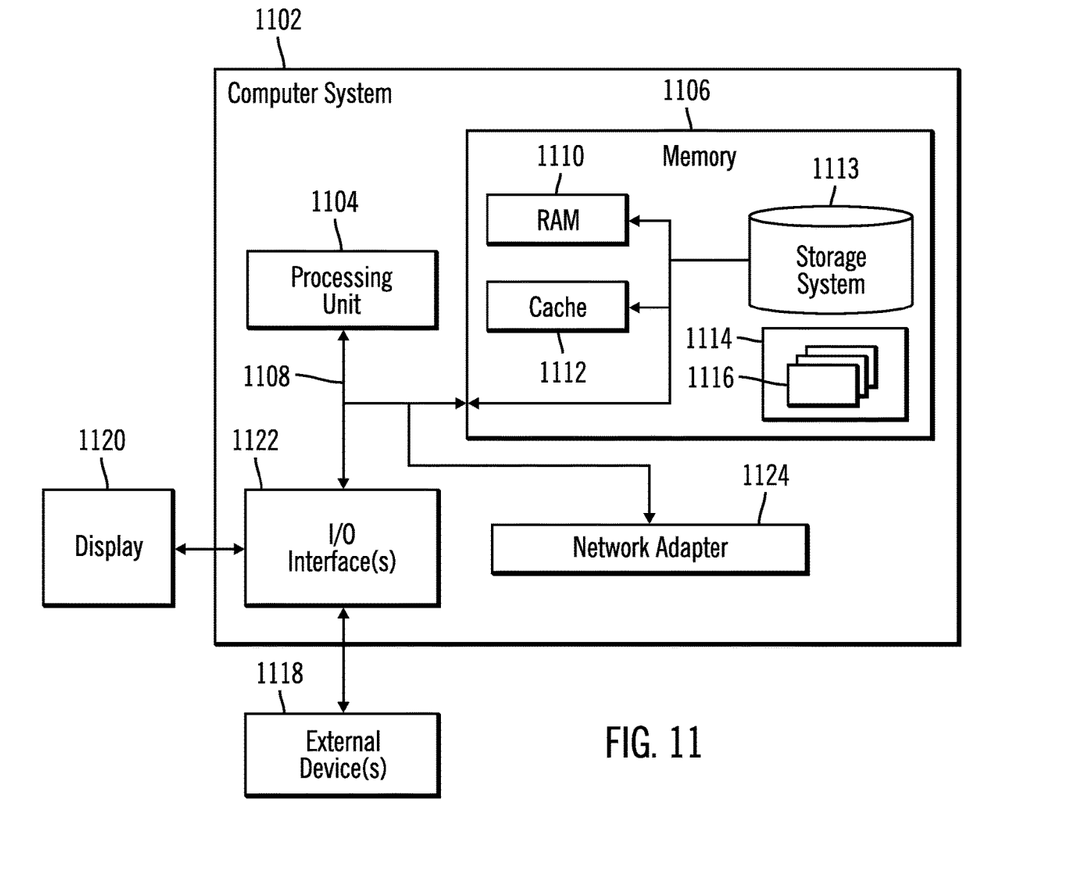
FIG. 11 illustrates a computing environment in which the components of FIG. 1 may be implemented.

The computational components of FIG. 1, including the backup server 100, hosts 110, and source servers 102$_1$, 102$_2$ . . . 102$_n$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for backing up data from a plurality of source data sets to a backup storage, wherein the computer program product comprises a computer readable storage medium having computer readable program code embodied therein that when executed performs operations, the operations comprising:

receiving event messages from event managers processing changes to data objects at the source data sets, wherein each event message indicates an update to a changed data object in one of the source data sets;

adding the event messages to at least one message queue;

reading the event messages in the at least one message queue;

generating a record for each of the read event messages to transform a read event message into a record having a record identifier and data object information including information from the event message on a changed data object in one of the source data sets;

adding the generated record to a database for each of the read event messages;

querying the database to determine records having data object information for changed data objects that satisfy a backup criteria; and copying the changed data objects in at least one of the source data sets, indicated in records having data object information that satisfies the backup criteria, to the backup storage.

2. The computer program product of claim 1, wherein the copying the changed data objects comprises:

determining, from the determined records satisfying the backup criteria, storage locations of the changed data objects in the source data sets;

reading the changed data objects from the determined storage locations in the source data sets; and copying the read changed data objects to the backup storage.

3. The computer program product of claim 1, wherein there are a plurality of message queues and consumer processes, each of the consumer processes assigned to process event messages from one of the message queues, wherein there is one message queue for each of the source data sets to receive event messages for changed data objects in a source data set, and wherein the operations further comprise:

periodically invoking a consumer process to read the event messages in one of the message queues and generate and add records to the database for each of the read event messages.

4. The computer program product of claim 1, wherein the data object information in each of the records in the database indicates a time the changed data object was changed, and wherein the backup criteria indicates a point-in-time to determine changed data objects changed since the point-in-time to create a backup set of changed data objects from the source data sets that changed since the point-in-time.

5. The computer program product of claim 1, wherein the event messages are generated immediately after modifying the changed data objects to provide information on real-time changes to changed data objects in the source data sets to the at least one message queue and the database.

6. A computer program product for backing up data from a plurality of source data sets to a backup storage, wherein the computer program product comprises a computer readable storage medium having computer readable program code embodied therein that when executed performs operations, the operations comprising:

receiving event messages from event managers processing changes to data objects at the source data sets, wherein each event indicates an update to a changed data object in one of the source data sets;

adding the event messages a message queue;

sending a notification to a consumer of the message queue to cause the consumer to perform:

reading the event messages in the message queue in response to receiving the notification of the event messages added to the message queue;

determining from the read event messages whether information on the changed data object satisfies a backup criteria; and copying the changed data objects in at least one of the source data sets that satisfy the backup criteria to the backup storage.

7. The computer program product of claim 6, wherein the operations further comprise:

in response to adding the event message to the message queue, determining a consumer process subscribed to the message queue to which the event message was added, wherein the notification is sent to the consumer process.

8. The computer program product of claim 6, wherein the copying the changed data objects comprises:

determining, from the event messages having information satisfying the backup criteria, storage locations of the changed data objects in the source data sets;

reading the changed data objects from the determined storage locations in the source data sets; and transferring the read changed data objects to the backup storage.

9. The computer program product of claim 6, wherein there are a plurality of message queues and consumer processes, each of the consumer processes assigned to process event messages from one of the message queues, wherein there is one message queue for each of the source data sets to receive event messages on changes to the changed data objects in a source data set.

10. The computer program product of claim 6, wherein each of the event messages indicates a time the changed data object was changed, and wherein the backup criteria indicates a point-in-time to determine data objects changed since the point-in-time to create a backup set of data objects from the source data sets that changed since the point-in-time.

11. The computer program product of claim 6, wherein the operations further comprise:

adding a record to a database for each of the read event messages, wherein records added to the database include information on changed data objects and changed data in the changed data objects.

12. A system for backing up data from a plurality of source data sets to a backup storage, comprising:

a processor; and a computer readable storage medium having computer readable program code embodied therein that when executed by the processor performs operations, the operations comprising:

receiving event messages from event managers processing changes to data objects at the source data sets, wherein each event message indicates an update to a changed data object in one of the source data sets;

adding the event messages to at least one message queue;

reading the event messages in the at least one message queue;

generating a record for each of the read event messages to transform a read event message into a record having a record identifier and data object information including information from the event message on a changed data object in one of the source data sets;

adding the generated record to a database for each of the read event messages;

querying the database to determine records having data object information for changed data objects that satisfy a backup criteria; and copying the changed data objects in at least one of the source data sets, indicated in records having data object information that satisfies the backup criteria, to the backup storage;

copying the changed data objects in at least one of the source data sets that satisfy the backup criteria to the backup storage.

13. The system of claim 12, wherein the copying the changed data objects comprises:

determining, from the determined records satisfying the backup criteria, storage locations of the changed data objects in the source data sets;

reading the changed data objects from the determined storage locations in the source data sets; and copying the read changed data objects to the backup storage.

14. The system of claim 12, wherein each of the records in the database indicates a time the changed data object was changed, and wherein the backup criteria indicates a point-in-time to determine changed data objects changed since the point-in-time to create a backup set of changed data objects from the source data sets that changed since the point-in-time.

15. The system of claim 12, wherein the event messages are generated immediately after modifying the changed data objects to provide information on real-time changes to changed data objects in the source data sets to the at least one message queue and the database.

16. A system for backing up data from a plurality of source data sets to a backup storage, comprising:

a processor; and a computer readable storage medium having computer readable program code embodied therein that when executed by the processor performs operations, the operations comprising:

receiving event messages from event managers processing changes to data objects at the source data sets, wherein each event indicates an update to a changed data object in one of the source data sets;

adding the event messages to a message queue;

sending a notification to a consumer of the message queue to cause the consumer to perform:

reading the event messages in the message queue in response to receiving the notification of the event messages added to the message queue;

determining from the read event messages whether information on the changed data object satisfies a backup criteria; and copying the changed data objects in at least one of the source data sets that satisfy the backup criteria to the backup storage.

17. The system of claim 16, wherein the operations further comprise:

in response to adding an event message to a message queue of the message queue, determining a consumer process subscribed to the message queue to which the event message was added, wherein the notification is sent to the consumer process.

18. The system of claim 16, wherein the copying the changed data objects comprises:

determining, from the event messages having information satisfying the backup criteria, storage locations of the changed data objects in the source data sets;

reading the changed data objects from the determined storage locations in the source data sets; and transferring the read changed data objects to the backup storage.

19. A method for backing up data from a plurality of source data sets to a backup storage, comprising:

receiving event messages from event managers processing changes to data objects at the source data sets from the source data sets, wherein each event indicates an update to a changed data object in one of the source data sets;

adding the event messages to a message queue;

sending a notification to a consumer of the message queue to cause the consumer to perform:

reading the event messages in the message queue in response to receiving the notification of the event messages added to the message queue;

determining from the read event messages whether information on the changed data object satisfies a backup criteria; and copying the changed data objects in at least one of the source data sets that satisfy the backup criteria to the backup storage.

20. The method of claim 19, further comprising:

in response to adding an event message to a message queue of the message queue, determining a consumer process subscribed to the message queue to which the event message was added, wherein the notification is sent to the consumer process.

21. The method of claim 19, wherein the copying the changed data objects comprises:

determining, from the event messages having information satisfying the backup criteria, storage locations of the changed data objects in the source data sets;

reading the changed data objects from the determined storage locations in the source data sets; and transferring the read changed data objects to the backup storage.

22. The method of claim 19, further comprising:

adding a record to a database for each of the read event messages, wherein records added to the database include information on changed data objects and changed data in the changed data objects.

23. The computer program product of claim 1, wherein the event messages and records added to the database for the read event messages include timestamps for the changed data objects, and wherein the backup criteria determines records in the database for changed data objects having timestamps that satisfy a condition with respect to a point-in-time.

24. The computer program product of claim 6, wherein the event messages include timestamps for the changed data objects, and wherein the backup criteria determines event messages having timestamps that satisfy a condition with respect to a point-in-time.

* * * * *